Figure 1:
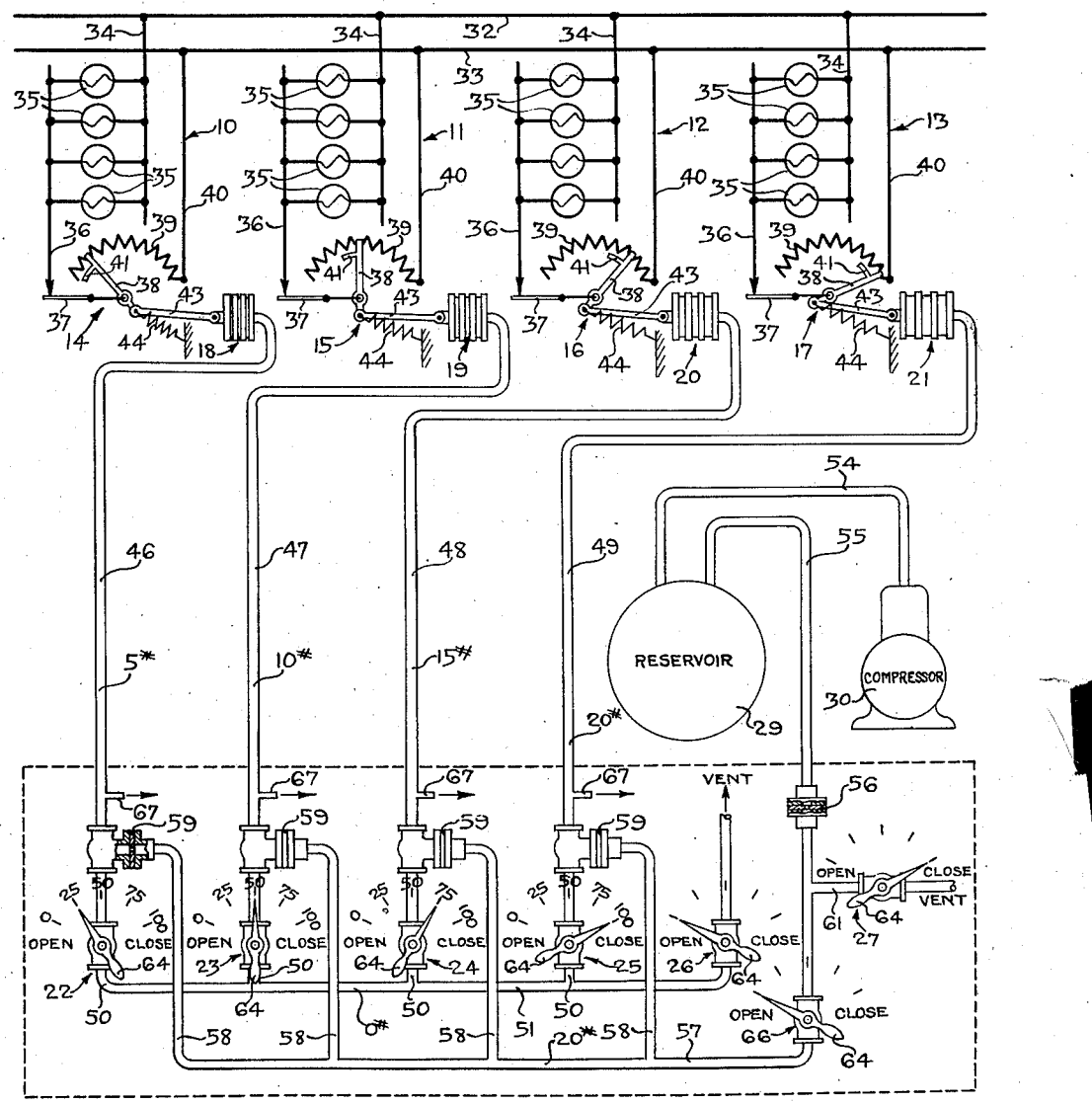

July 5, 1938.  W. L. McGRATH  2,122,887

LIGHTING CONTROL SYSTEM

Filed April 27, 1936

Inventor
William L. McGrath
By George H. Fisher
Attorney

Patented July 5, 1938

2,122,887

UNITED STATES PATENT OFFICE 2,122,887

LIGHTING CONTROL SYSTEM

William L. McGrath, Minneapolis, Minn., assignor to Minneapolis-Honeywell Regulator Company, Minneapolis, Minn., a corporation of Delaware Application April 27, 1936, Serial No. 76,534

23 Claims. (Cl. 175—312)

This invention relates to lighting control systems in general and more particularly to lighting control systems for use in theaters, auditoriums and the like.

Present day theaters are equipped with various groups of lights for obtaining different lighting effects on the stage and in the auditorium proper. These groups of lights usually comprise footlights, border lights and flood lights for the stage and dome lights, wall lights and alcove lights for the auditorium. Each group is generally provided with a plurality of variously colored lights. The various lights of the various groups are usually controlled by means of an ordinary resistance type dimmer plate or by means of the more recent core type reactors where the lighting load is relatively great.

Attempts have been made in the past to remotely control the various lights of the various groups but these attempts have not been entirely successful.

It is, therefore, the prime object of this invention to control the various lights of the various groups in a new and novel manner whereby innumerable combinations of colors and intensities of lights may be obtained and accurately controlled.

In carrying out my invention, I contemplate locating the resistance type dimmer plates or the core type reactors adjacent the lights that they control, operating these resistance type dimmer plates or core type reactors by power means, which may take the form of pressure motors operatively connected thereto, and controlling these pressure motors by control devices which may take the form of valves located on a conveniently located panel board.

An object of this invention is to provide a control system for controlling the intensities or colors of lights comprising a pressure operated motor operable to a plurality of positions and a remotely located valve for controlling the pressures delivered to the motor whereby the intensities or colors of the lights may be accurately controlled.

Another object of this invention is to provide a plurality of control devices for controlling the intensities or colors of lights with a pressure motor for each control device, valve means associated with each control device for controlling the same and a single valve means for proportionately dimming the lights.

Still another object of this invention is to provide a lighting control system having a plurality of control devices with a pressure motor for each control device, control valve means for each pressure motor and single control valve means for proportionately brightening the lights.

Other objects and advantages will become apparent to those skilled in the art upon reference to the accompanying specification, claims and drawing, in which drawing;

Figure 1 diagrammatically illustrates my lighting control system, and

Figure 2:
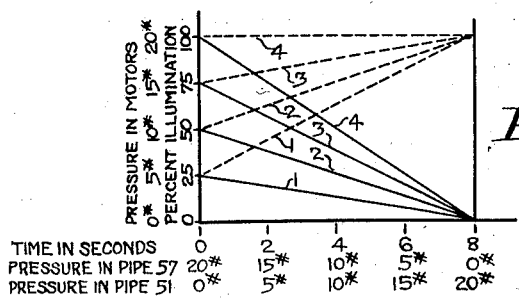

Figure 2 is a graph illustrating the theory of the proportionate brightening and dimming portion of my invention.

Referring now to Figure 1, a plurality of lighting loads are generally designated at 10, 11, 12, and 13. These lights may be located in any desired place. The lighting loads 10, 11, 12, and 13 are controlled by lighting control devices 14, 15, 16, and 17 respectively. Although any type of lighting control device may be used, I have shown, for purposes of illustration, a conventional dimmer plate for this purpose. The lighting control devices 14, 15, 16, and 17 may be operated by pressure motors 18, 19, 20, and 21 respectively, the pressure motors being illustrated as expansible bellows. The pressure motors 18, 19, 20, and 21 are controlled by control valves 22, 23, 24, and 25 respectively, whereby the pressure motors may be individually adjusted to any desired position.

A control valve, generally indicated at 26, is provided to cause simultaneous operation of all of the pressure motors whereby the light intensities of the lighting loads may be proportionately brightened. Another control valve, generally designated at 27, is provided for simultaneously operating all of the pressure motors to cause proportionate dimming of the lights. Air under pressure is supplied to the control system from a reservoir 29. A compressor 30 supplies air to the reservoir 29 and maintains the pressure in the reservoir 29 substantially constant. For purposes of illustration, the pressure maintained in the reservoir is assumed to be substantially 20#.

Line wires leading from some source of power, not shown, are designated 32 and 33. The line wire 32 is connected by a wire 34 to lights 35 forming the lighting load. Lights 35 are in turn connected by a wire 36 and a switch 37 to the slider 38 of the control devices. The slider 38 is adapted to slide across a resistance 39 one end of which is connected by a wire 40 to the other line wire 33. The slider 38 is connected by a link 43 to the pressure motors and upon expansion of the pressure motors, the slider 38 is rotated in a clockwise direction. A spring 44 is provided for normally urging the sliders 38 in a counter-clockwise direction. The arrangement is such that as the pressure in the pressure motors increases, the sliders 38 are moved towards the right to decrease the resistance in series with the lights 35 whereby the light intensities of the lights are brightened. Upon a decrease in pressure in the pressure motors, the sliders 38 are moved to the left to increase the resistance in series with the lights 35 to decrease the light intensities thereof. When substantially all of the resistance has been placed in series with the lights 35 to decrease their illumination to a minimum value, a lug 41 carried by slider 38 opens switch 37 whereby the lights are extinguished.

The pressure motors 18, 19, 20, and 21 are connected to the valves 22, 23, 24, and 25 by means of pipes 46, 47, 48, and 49 respectively. The valves 22, 23, 24, and 25 are in turn connected to branch pipes 50 which terminate in a vent header 51, which is controlled by the valve 26 so that when the valve 26 is open the header 51 is vented to atmosphere and when the valve 26 is closed, venting of the header 51 is prevented. The compressor supplies compressed air to the reservoir 29 through a pipe 54 and compressed air is taken from the reservoir 29 through a pipe 25 and an orifice 56 and delivered into a supply header 57. The supply header 57 is connected by branch pipes 58 through orifices 59 to the pipes 46, 47, 48, and 49. The supply header 57 is adapted to be vented through a vent pipe 61 controlled by the control valve, generally indicated at 27.

Each of the control valves is provided with a combined operating handle and pointer 64 for positioning the valves and for indicating the positions thereof. Suitable indications may be provided to cooperate with the pointer to indicate the positions of the valves. The indications of valves 22, 23, 24, and 25 are illustrated as indicating the percentage of maximum light intensities, while the indications of the valves 26 and 27 indicate the positions of these valves. As shown by the designations associated with each valve, the valve is open when the pointer is in the extreme left position and is closed when the pointer is in the extreme right position. With the various valves in the positions shown in the drawing, the vent valve 27 is closed, the vent valve 26 is open, the control valve 22 is three-quarters open, the control valve 23 is half open, the control valve 24 is one-quarter open and the control valve 25 is closed. With these valve positions and with a 20# air pressure supply, the pressure in the supply header 57, and consequently the branch pipes 58, is 20#, the pressure in the vent header 51 is 0#, and the pressures in the pipes 46, 47, 48, and 49, and consequently the pressure motors 18, 19, 20, and 21 are 5#, 10#, 15#, and 20# respectively. With these pressures existing in these pipes and pressure motors, the lights 10, 11, 12, and 13 are adjusted to 25%, 50%, 75% and 100% of their maximum light intensities.

Movement of any of the valves 22, 23, 24, and 25 from their respective positions shown in the drawing will cause proportionate movement of their associated pressure motors and consequent proportionate adjustment of the lighting loads controlled thereby. Specifically, if the valve 22 is moved from the three-quarter open position to half open position, the light intensities of the lights 10 will be increased from 25% to 50%. Therefore, I have provided a control system wherein the lighting loads may be individually and independently adjusted as desired.

The above operation is predicated on the fact that the valve 26 is open and the valve 27 is closed. If the valve 26 is maintained open to maintain a pressure in the vent header 51 of substantially 0# and if the valve 27 is moved from the closed position shown towards the open position, the pressure in the supply header 57 will decrease and when the valve has become fully open, the pressure in the supply header 57 will be substantially zero. As pointed out above, there is an orifice 59 between the branch supply pipes 58 and the pipes 46, 47, 48, and 49 and by reason of these orifices, the pressures in the pipes 46, 47, 48, and 49 will be reduced at a rate proportionate to the decrease in pressure in the supply header 57. Specifically, as the pressure in the supply header 57 is reduced, to say 10#, the pressures in the pipes 46, 47, 48, and 49 will be reduced to 2½#, 5#, 7½# and 10# respectively and when the pressure in the supply header 57 is reduced to 0#, the pressure in the pipes 46, 47, 48, and 49 will be reduced to 0# and they will all be reduced to 0# at substantially the same time.

This mode of operation is graphically illustrated in Figure 2, wherein the solid lines 1, 2, 3, and 4 designate the pressures in the pipes 46, 47, 48, and 49 respectively. From this graph it is seen that as the pressure in the supply header 57 is gradually decreased from 20# to 0#, the pressures in the pipes 46, 47, 48, and 49 are reduced to 0# but at a different rate whereby they are all reduced to 0# at substantially the same time. Since the light intensities of the lights 10, 11, 12, and 13 are directly proportional to the pressures existing within the pipes 46, 47, 48, and 49, the light intensities of these lights are proportionately dimmed so that they are all extinguished at substantially the same time. This fact is also illustrated in Figure 2 by the solid lines 1, 2, 3, and 4 when taken in connection with the ordinates and abscissas designated time and percentage of illumination.

Assume that the valves 22, 23, 24, and 25 are in the position shown in Figure 1, that valve 26 is open as in Figure 1, and that valve 27 is also open, therefore the pressures in the supply header 57 and in the vent header 51 are substantially 0#. The pressure motors 18, 19, 20, and 21 are contracted and the lights are all extinguished. Movement of the valve 27 from this open position towards the closed position, shown in Figure 1, gradually increases the pressure in the supply header 57 and the pressures in the pipes 46, 47, 48, and 49 will be gradually increased at a rate dependent upon the positions of the valves 22, 23, 24, and 25. When the valve 27 is fully closed, the pressures in the pipes 46, 47, 48, and 49 will arrive at pressure values of 5#, 10#, 15# and 20# respectively at substantially the same time. Therefore, movement of the valve 27 from the open position to the closed position causes proportionate increasing of the pressures in the motors 18, 19, 20, and 21 to the pressures determined by the positions of their associated control valves, and consequently, the lights will be brightened from an extinguished condition to a per cent of illumination determined by the positions of their associated control valves.

From the above it is seen that I have not only provided a lighting control system where the lights may be individually adjusted but I have also provided a means whereby the lights may be proportionately dimmed from any intensity to a given intensity and proportionately brightened from the given intensity to any selected intensities.

If the valve 27 is maintained in the closed position shown in Figure 1 so as to maintain substantially a 20# pressure in the supply header 57 and if the valve 26 is moved gradually from the open position to the closed position, the pressure in the vent header 51 is allowed to increase from 0# and when the valve 26 is entirely closed, the pressure in the vent header 51 will increase to substantially 20#. By reason of the maintenance of a pressure of 20# in the supply header 57 and by reason of the orifices 59, an increase in pressure in the vent header 51 causes a proportionate increase in the pressure in the pipes 46, 47, 48, and 49 and when the pressure in the vent header 51 reaches 20#, the pressure in the pipes 46, 47, 48, and 49 will likewise reach 20#. Reference is again made to Figure 2 wherein these increases in pressure are designated by the dotted lines, the dotted lines 1, 2, 3 and 4 representing the pressures in the pipes 46, 47, 48, and 49 respectively. Since the pressures in these pipes all reach 20# at substantially the same time and in a proportionate manner and since the light intensities of the lights are adjusted in a manner proportionate to the pressures in their respective pipes, the light intensities are increased from the values shown to 100% intensity and they all arrive at this 100% value at substantially the same time.

Assume that the valves 22, 23, 24, and 25 are in the position shown in Figure 1, that the valve 27 is closed as in Figure 1, and that the valve 26 is closed. By reason of these valve positions, the pressures in the supply header 57 and the vent header 51 are substantially 20# and the pressures in the pressure motors 18, 19, 20, and 21 are also substantially 20#. Therefore, the lights are maintained at 100% brilliancy. Movement of valve 26 from the closed position to the open position in Figure 1 causes gradual reducing of the pressure in the vent header 51 from 20# to 0#, and consequently, the pressures in the pressure motors 18, 19, 20, and 21 are proportionately reduced to pressure values corresponding to the adjustments of the valves 22, 23, 24, and 25 respectively and the pressures in the various pressure motors will arrive at their reduced pressure values at substantially the same time. Therefore, the lights are dimmed from 100% intensity to that intensity determined by their associated control valves and the lights will all arrive at the selected intensities at substantially the same time.

Therefore, by reason of the above construction, I have provided true proportionate brightening of the lights from given values to a predetermined other value and also true proportionate dimming of the lights from that predetermined other value to the selected values.

In Figure 1, I have also illustrated another way of accomplishing proportional dimming instead of that outlined above. This other manner contemplates the use of a valve 66 in the supply header 57 and also the use of orifice vents 67 in the pipes 46, 47, 48, and 49. The valve 66 controls directly the pressure in the supply header 57. As the valve 66 is moved from the open position to the closed position, the pressure in the supply header 57 is allowed to decrease by reason of the vents 67. Due to the orifices 59 the pressures in the pipes 46, 47, 48, and 49 decrease at a rate proportionate to the rate of decrease of pressure in the supply header 57 which gives true proportional dimming of the lights and the specific manner in which this is accomplished is graphically illustrated in Figure 2.

It is to be understood that the above exemplification of my invention is for purposes of illustration only and not for purposes of limitation, also the various pressures utilized in connection with the description of my invention may be varied at will to arrive at the desired mode of operation. Other forms of my invention may become obvious to those skilled in the art and consequently this invention is to be limited only by the scope of the appended claims and prior art.

I claim as my invention:

1. In a lighting control system, the combination of lighting means for giving a desired lighting effect, regulating means in control of said lighting means, a pressure motor for positioning said regulating means, means for biasing the pressure motor and the regulating means in one direction, a source of air under pressure, a vent for said pressure motor, and valve means controlling the air pressure in said pressure motor, the air under pressure acting against said biasing means whereby the lighting effect is controlled in accordance with the positions of said valve means.

2. In a lighting control system, the combination of lighting means for giving a desired lighting effect, regulating means in control of said lighting means, a pressure motor for positioning said regulating means, means for biasing the pressure motor and the regulating means in one direction, a source of air under pressure connected to said motor, the air under pressure acting against said biasing means, a vent for said motor, and valve means for controlling said vent whereby the lighting effect is controlled in accordance with the position of said valve means.

3. In a lighting control system, the combination of lighting means for giving a desired lighting effect, regulating means in control of said lighting means, a pressure motor for positioning said regulating means, means for biasing the pressure motor and the regulating means in one direction, a source of air under pressure connected to said motor, the air under pressure acting against said biasing means, an orifice in said connection, a vent for said motor, and valve means for controlling said vent whereby the lighting effect is controlled in accordance with the position of said valve means.

4. In a lighting control system, the combination of lighting means for giving a desired lighting effect, regulating means in control of said lighting means, a pressure motor for positioning said regulating means, means for biasing the pressure motor and the regulating means in one direction, a source of air under pressure, a vent for said pressure motor, valve means controlling the air pressure in said pressure motor, the air under pressure acting against said biasing means whereby the lighting effect is controlled in accordance with the positions of said valve means, and other valve means controlling the supply of air pressure to said pressure motor.

5. In a lighting control system, the combination of lighting means for giving a desired lighting effect, regulating means in control of said lighting means, a pressure motor for positioning said regulating means, means for biasing the pressure motor and the regulating means in one direction, a source of air under pressure, a connection between said source of pressure and said motor, the air under pressure acting against said biasing means, a vent for said motor, valve means for controlling said vent whereby the lighting effect is controlled in accordance with the position of said valve means, and valve means associated with said connection for controlling the supply of air to said pressure motor.

6. In a lighting control system, the combination of lighting means for giving a desired lighting effect, regulating means in control of said lighting means, a pressure motor for positioning said regulating means, means for biasing the pressure motor and the regulating means in one direction, a source of air under pressure connected to said motor, the air under pressure acting against said biasing means, a vent for said motor, valve means for controlling said vent whereby the lighting effect is controlled in accordance with the position of said valve means, and other valve means associated with said vent for additionally controlling the venting of said motor.

7. In a lighting control system, the combination of lighting means for giving a desired lighting effect, regulating means in control of said lighting means, a pressure motor for positioning said regulating means, means for biasing the pressure motor and the regulating means in one direction, a source of air under pressure, a connection between the source of pressure and said motor, the air under pressure acting against said biasing means, a vent for said motor, valve means for controlling said vent whereby the lighting effect is controlled in accordance with the position of said valve means, valve means associated with said connection for controlling the supply of air to said pressure motor, and other valve means associated with said vent for additionally controlling the venting of said motor.

8. In a lighting control system, the combination of lighting means for giving a desired lighting effect, a plurality of regulating means in control of said lighting means, a pressure motor for each regulating means for positioning said regulating means, means for biasing each pressure motor and regulating means in one direction, a source of air under pressure, a vent for each pressure motor, and valve means for each pressure motor for controlling the air pressure in said motors, the air under pressure acting against said biasing means whereby each motor is positioned in accordance with the adjustment of its associated valve means to give a desired lighting effect.

9. In a lighting control system, the combination of lighting means for giving a desired lighting effect, a plurality of regulating means in control of said lighting means, a pressure motor for each regulating means for positioning said regulating means, means for biasing each pressure motor and regulating means in one direction, a source of air under pressure, a vent for each pressure motor, valve means for each pressure motor for controlling the air pressure in said motors, the air pressure acting against said biasing means whereby each motor is positioned in accordance with the adjustment of its associated valve means to give a desired lighting effect, and other valve means in control of the supply of compressed air to said motors to cause proportionate operation of said motors whereby the lighting effect is proportionately varied.

10. In a lighting control system, the combination of lighting means for giving a desired lighting effect, a plurality of regulating means in control of said lighting means, a pressure motor for each regulating means for positioning said regulating means, a source of air under pressure, a supply header connected to said source of air under pressure, connections between said supply header and said pressure motors, a vent header, connections between said vent header and said pressure motors, and valve means in each of said last mentioned connections to variably vent each of said motors whereby a desired lighting effect is obtained.

11. In a lighting control system, the combination of lighting means for giving a desired lighting effect, a plurality of regulating means in control of said lighting means, a pressure motor for each regulating means for positioning said regulating means, a source of air under pressure, a supply header connected to said source of air under pressure, connections between said supply header and said pressure motors, a vent header, connections between said vent header and said pressure motors, valve means in each of said last mentioned connections to variably vent each of said motors whereby a desired lighting effect is obtained, and valve means in control of the supply of air to said supply header to variably position all of said motors whereby lighting effect is proportionately varied.

12. In a lighting control system, the combination of lighting means for giving a desired lighting effect, a plurality of regulating means in control of said lighting means, a pressure motor for each regulating means for positioning said regulating means, a source of air under pressure, a supply header connected to said source of air under pressure, connections between said supply header and said pressure motors, a vent header, connections between said vent header and said pressure motors, valve means in each of said last mentioned connections to variably vent each of said motors whereby a desired lighting effect is obtained, and valve means in control of said vent header to variably position all of said motors whereby the lighting effect is proportionately varied.

13. In a lighting control system, the combination of lighting means for giving a desired lighting effect, a plurality of regulating means in control of said lighting means, a pressure motor for each regulating means for positioning said regulating means, a source of air under pressure, a supply header connected to said source of air under pressure, connections between said supply header and said pressure motors, a vent header, connections between said vent header and said pressure motors, valve means in each of said last mentioned connections to variably vent each of said motors whereby a desired lighting effect is obtained, and valve means in control of said supply header and in control of said vent header to variably position all of said motors whereby the lighting effect is proportionately varied.

14. In a lighting control system, the combination of lighting means for giving a desired lighting effect, a plurality of regulating means in control of said lighting means, a pressure motor for each regulating means for positioning said regulating means, a source of air under pressure, a supply header connected to said source of air under pressure, connections between said supply header and said pressure motors, a vent header, connections between said vent header and said pressure motors, valve means in each of said last mentioned connections to variably vent each of said motors whereby a desired lighting effect is obtained, a vent for said supply header, and valve means in control of said vent to variably position all of said motors whereby the lighting effect is proportionately varied.

15. In a lighting control system, the combination of lighting means for giving a desired lighting effect, a plurality of regulating means in control of said lighting means, a pressure motor for each regulating means for positioning said regulating means, a source of air under pressure, a supply header connected to said source of air under pressure, connections between said supply header and said pressure motors, a vent header, connections between said vent header and said pressure motors, valve means in each of said last mentioned connections to variably vent each of said motors whereby a desired lighting effect is obtained, a vent for said supply header, a vent for said vent header, and valve means in control of said vents to variably position all of said motors whereby the lighting effect is proportionately varied.

16. In a control system, the combination of a plurality of pressure motors, a source of fluid under pressure, a supply header connected to said source, connections between said supply header and each of said motors, a vent header, connections between said vent header and each of said motors, valve means in said last mentioned connections to adjustably position said motors, a vent for said vent header, valve means in control of said vent, a vent for said supply header, and valve means in control of said last mentioned vent.

17. In a control system, the combination of a plurality of pressure motors, a source of fluid under pressure, a supply header connected to said source, connections between said supply header and each of said motors, a vent header, connections between said vent header and each of said motors, valve means in said last mentioned connections to adjustably position said motors, a vent for said vent header, valve means in control of said vent, valve means in control of the supply of fluid to said supply header, and orifice vent means for said supply.

18. In a control system, the combination of a plurality of pressure motors, a source of fluid under pressure, a supply header connected to said source, a vent header, connections between said supply header, each of said motors and said vent header, valve means for each motor in said connections to adjustably position each motor in accordance with the adjustment of its associated valve means, and valve means in control of said vent header for additionally controlling the positions of all of said motors.

19. In a control system, the combination of a plurality of pressure motors, a source of fluid under pressure, a supply header connected to said source, a vent header, connections between said supply header, each of said motors and said vent header, valve means for each motor in said connections to adjustably position each motor in accordance with the adjustment of its associated valve means, and valve means in control of said supply header for additionally controlling the positions of all of said motors.

20. In a control system, the combination of a plurality of pressure motors, a source of fluid under pressure, a supply header connected to said source, a vent header, connections between said supply header, each of said motors and said vent header, valve means for each motor in said connections to adjustably position each motor in accordance with the adjustment of its associated valve means, valve means in control of said vent header for additionally controlling the positions of all of said motors, and valve means in control of said supply header for additionally controlling the positions of all of said motors.

21. In a control system, the combination of a plurality of pressure motors, means for supplying actuating fluid to each of said pressure motors and venting actuating fluid therefrom, valve means for said means and associated with each pressure motor for controlling the pressure therein whereby each pressure motor may be positioned in accordance with the adjustment of its associated valve means, and valve means for controlling the venting of the actuating fluid from all of the pressure motors.

22. In a control system, the combination of a plurality of pressure motors, means for supplying actuating fluid to each of said pressure motors, and venting actuating fluid therefrom, valve means for said means and associated with each pressure motor for controlling the pressure therein whereby each pressure motor may be positioned in accordance with the adjustment of its associated valve means, and valve means for venting the actuating fluid from all of the pressure motors.

23. In a control system, the combination of a plurality of pressure motors, means for supplying actuating fluid to each of said pressure motors and venting actuating fluid therefrom, valve means for said means and associated with each pressure motor for controlling the pressure therein whereby each pressure motor may be positioned in accordance with the adjustment of its associated valve means, and valve means for preventing venting of the actuating fluid from all of the pressure motors.

WILLIAM L. McGRATH.